(12) United States Patent
Gesue

(10) Patent No.: US 7,394,019 B2
(45) Date of Patent: Jul. 1, 2008

(54) COMPACT FLUSH-MOUNT SELF-CONTAINED RECEPTACLE (SCR)

(76) Inventor: Rick Gesue, 3213 Vance Rd., Monkton, MD (US) 21111

( * ) Notice: Subject to any disclaimer, the term of this patent is extended or adjusted under 35 U.S.C. 154(b) by 26 days.

(21) Appl. No.: 11/235,889

(22) Filed: Sep. 27, 2005

(65) Prior Publication Data

US 2006/0065423 A1    Mar. 30, 2006

Related U.S. Application Data

(60) Provisional application No. 60/613,278, filed on Sep. 28, 2004.

(51) Int. Cl.
*H01H 9/02* (2006.01)

(52) U.S. Cl. .............................. 174/53; 174/66; 174/67; 220/241; 439/650

(58) Field of Classification Search .................. 174/53, 174/66, 67, 59, 50; 220/3.8, 241, 242; 439/500, 439/650, 535, 106, 107, 108, 122
See application file for complete search history.

(56) References Cited

U.S. PATENT DOCUMENTS

| | | | | |
|---|---|---|---|---|
| 3,744,044 A | * | 7/1973 | Kinsey | 439/337 |
| 3,771,098 A | * | 11/1973 | Dempsey | 439/101 |
| 5,329,437 A | * | 7/1994 | Briggs | 362/393 |
| 5,705,772 A | * | 1/1998 | Brown | 174/487 |
| 6,570,091 B1 | * | 5/2003 | Kesler et al. | 174/67 |

* cited by examiner

*Primary Examiner*—Dhiru R Patel
(74) *Attorney, Agent, or Firm*—Ober / Kaler; Royal W. Craig

(57) ABSTRACT

A compact self contained receptacle comprising a cylindrical housing flush-mounted to a wall or sill. The housing has a square central aperture for receiving a square receptacle inserted therein. Non-metallic sheath wire (NMS) is connected to the receptacle in pigtail manner with no exposed contacts. The sheath wire passes exteriorly through a hole in the rear of the housing. In addition, detent tabs are provided in the housing for engagement with cooperating ears on the receptacle to provide a snap-in configuration. The compact self contained receptacle provides 120 VAC electric service in a highly compact yet code-certified configuration. The assembly is much better suited for new construction installation and because it can be easily installed into any solid material wall or window sill and maintain its aesthetically pleasing look. Also, the assembly is very convenient for retrofit construction into existing walls or sills.

8 Claims, 5 Drawing Sheets

COMPACT FLUSH-MOUNT SELF-CONTAINED RECEPTACLE (SCR)

CROSS-REFERENCE TO RELATED APPLICATIONS

The present application derives priority from U.S. Provisional Patent Application 60/613,278 filed Sep. 28, 2004.

BACKGROUND OF THE INVENTION

1. Field of the Invention

The present invention relates to electrical receptacles and, more particularly, to a highly compact code-certified self-contained receptacle (SCR) including a flush-mounted housing and snap-in receptacle that can be easily installed into a wood window sill, or any other solid material surface having a minimum of ½" in thickness.

2. Description of the Background

Many people have been installing permanent electric window sill candles throughout their houses for decorative effect. In addition, there is a growing demand for new construction and/or retrofit lighting systems. To install these improvements in existing homes having a limited number of outlets/receptacles, one or more extension cords are usually required. If the intent is to place electric candles in more than one window, then the unsightly electric cords typically spoil the decorative effect. Moreover, the multiple cords create potentially unsafe situations and cause many house fires. New home construction often includes the installation of a sufficient number of electric outlets/receptacles, with many located directly below a window. However, even this fails to provide for permanent electric window sill candles which must plug directly into the wooden window sill.

Existing electrical receptacles typically employ a generally rectangular housing assembly with a dual-outlet receptacle. These duplex outlet/receptacles are widely used for residential and commercial applications. They usually have a depth dimension for the housing of about 2 inches or more to house the contacts and any other internal components, a length of about 4 inches, and a width of about 2 inches. Unfortunately, with dimensions on this scale the existing outlet/receptacles are not well suited for new construction and/or retrofit installation into solid material walls or window sills. They are simply too bulky. Moreover, once installed the receptacles do not appear flush, but instead protrude outward a small distance from the wall. Consequently, there is a significant commercial demand for a more compact self-contained receptacle (SCR). Prior improvements to wall outlet/receptacles have been largely focused on safety features. For example, U.S. Pat. No. 6,372,987 to Ha discloses a safety guard device for an electrical wall outlet which includes a base plate adapted to be fixed to an electrical receptacle. Locking means are also provided for locking the plates relative to each other when the electrical receptacle is covered by the cover plate. Similarly, U.S. Pat. No. 4,739,450 to Misencik shows a ground fault receptacle with compact component arrangement which employs a pre-assembly of molded plastic carrier elements supporting a sensing transformer, grounded neutral transformer, trip solenoid, and hybrid electronic circuit all disposed within the housing. However, there have been no known efforts to make a conventional wall outlet receptacle more compact and flush-fitting without violating existing electrical codes. Accordingly, it would be greatly advantageous to provide a single-outlet self-contained receptacle (SCR) that is extremely compact and flush-fitting, and which is well suited for new construction installation, as well as retrofit installation in existing construction, in solid material. This self-contained receptacle (SCR) can be "back wired" into the nearest power source.

SUMMARY OF THE INVENTION

It is, therefore, a primary object of the present invention to provide a highly compact code-certified self-contained receptacle (SCR) including a flush-mounted housing and snap-in receptacle that can be easily installed into an existing solid material wall or window sill for use in line voltage systems utilizing 120 VAC electric service.

It is another object to provide a single-outlet SCR that minimizes overall size without violating existing electrical codes, thereby making the compact self contained receptacle better suited for installation during new housing construction and equally well-suited for retrofit installation.

In addition to the foregoing, it is another object to provide a single-outlet SCR in which all appropriate safety considerations have been taken, including design considerations which prevent access to exposed wiring or electrical outlets.

It is yet another object to provide a single-outlet SCR that is aesthetically pleasing when in use or not, in which all appropriate safety considerations have been taken, including design considerations which prevent access to exposed wiring or electrical outlets.

It is another object to provide a single-outlet SCR as described above that is well-suited for use with a direct plug decorative electric candle as shown and described in U.S. Pat. No. 6,601,977 for "DIRECT PLUG ELECTRIC CANDLE LIGHTING SYSTEM, issued to the inventor herein.

According to the present invention, the above-described and other objects are accomplished by a compact self-contained receptacle (SCR) comprising a cylindrical housing flush-mounted to a solid material wall or sill. The housing has a square central aperture for receiving a square receptacle inserted therein. Non-metallic sheath wire (NMS) is connected to the receptacle in a pigtail manner with no exposed contacts. The sheath wire passes exteriorly through a hole in the rear of the housing. In addition, detent tabs are provided in the housing for engagement with cooperating ears on the receptacle to provide a snap-in configuration. The compact self-contained receptacle (SCR) provides 120 VAC electric service in a highly compact yet code-certified configuration. The assembly well-suited for installation during new construction, and is better suited for retrofit installation because it can be easily installed into an existing solid material wall or window sill, in both cases maintaining an aesthetically pleasing appearance.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
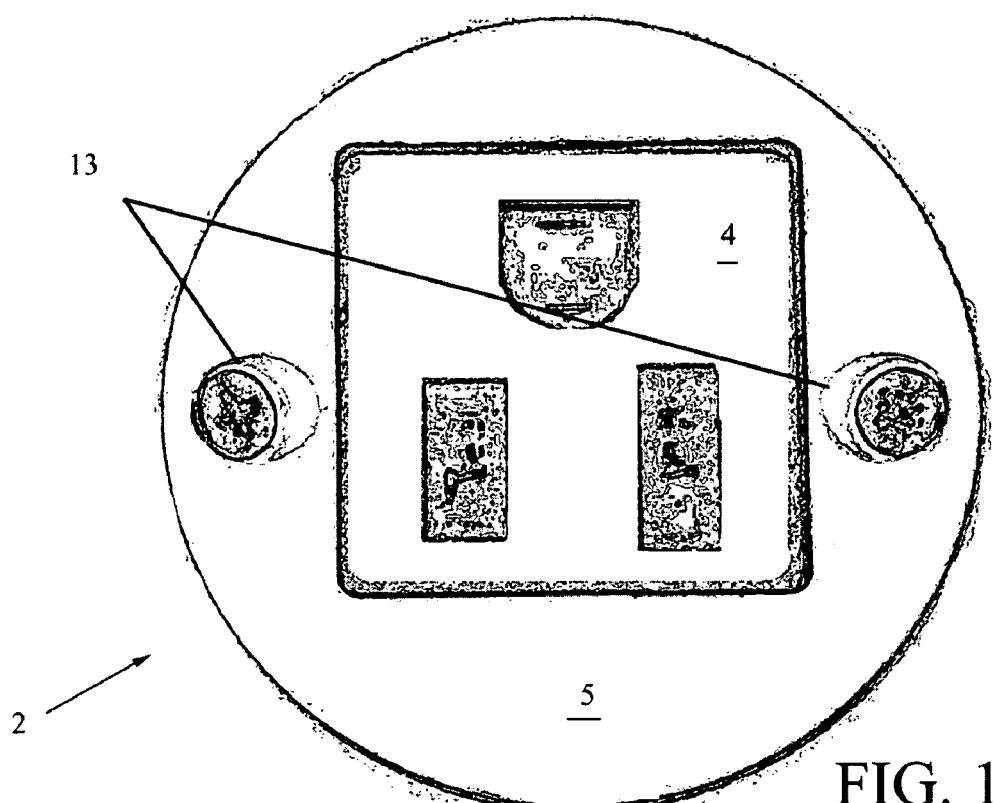
FIG. 1 is a front perspective view of the compact self-contained receptacle (SCR) 2 according to the present invention.
Figure 2:
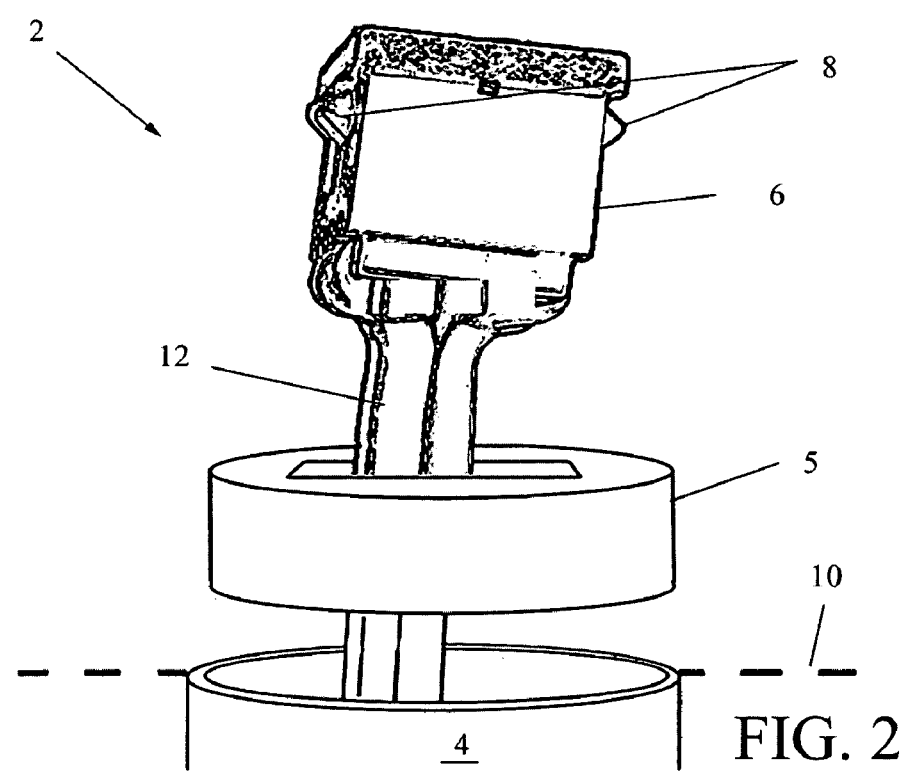
FIG. 2 is an exploded partially-disassembled view of the compact self-contained receptacle (SCR) 2 of FIG. 1.

FIG. 1 is a front perspective view of the compact self-contained receptacle (SCR) 2 according to the present invention. FIG. 2 is an exploded partially-disassembled view of the compact SCR 2. With combined reference to FIGS. 1 and 2, the compact SCR 2 generally includes a flush-mounted two-piece housing comprising an open-ended cylindrical enclosure 4, snap-on cylindrical cover plate 5, and snap-in receptacle 6.

The entire compact SCR 2 is intended for installation in a solid material (such as wood, plasterboard, formica, etc.) wall or hollow framed window sill 10, and the cover plate 5 is defined by opposing outwardly-angled bore-holes 13 to allow fixation by screws (screwed downward and outward) into the window sill 10. The resulting suspension of the receptacle 6 below the cover plate 5 and full enclosure within enclosure 4 prevents access, especially by children, when not in use and meets relevant electrical codes.

The cylindrical cover plate 5 snaps-over top of the enclosure 4, and the receptacle 6 snaps lengthwise into the cover plate 5, the body of the receptacle 6 being suspended below the cover plate 5 and entirely enclosed within the enclosure 4 for code compliance, the face of receptacle 6 remaining flush to window sill 10 and yet accessible for insertion of a conventional three-prong plug such as the direct plug decorative electric candle shown and described in U.S. Pat. No. 6,601,977 for "DIRECT PLUG ELECTRIC CANDLE LIGHTING SYSTEM, to the inventor herein. When not in use, the compact SCR 2 presents a flush and aesthetically pleasing appearance as seen in FIG. 1.

The snap-in receptacle 6 is removably anchored in cover plate 5 by locking detents 14 as will be described. The compact SCR 2 is connected to an existing 120 VAC electric service by an NMS (non-metallic sheath wire) power cable 12 that is run behind the solid material wall or window still 10.

Figure 3:
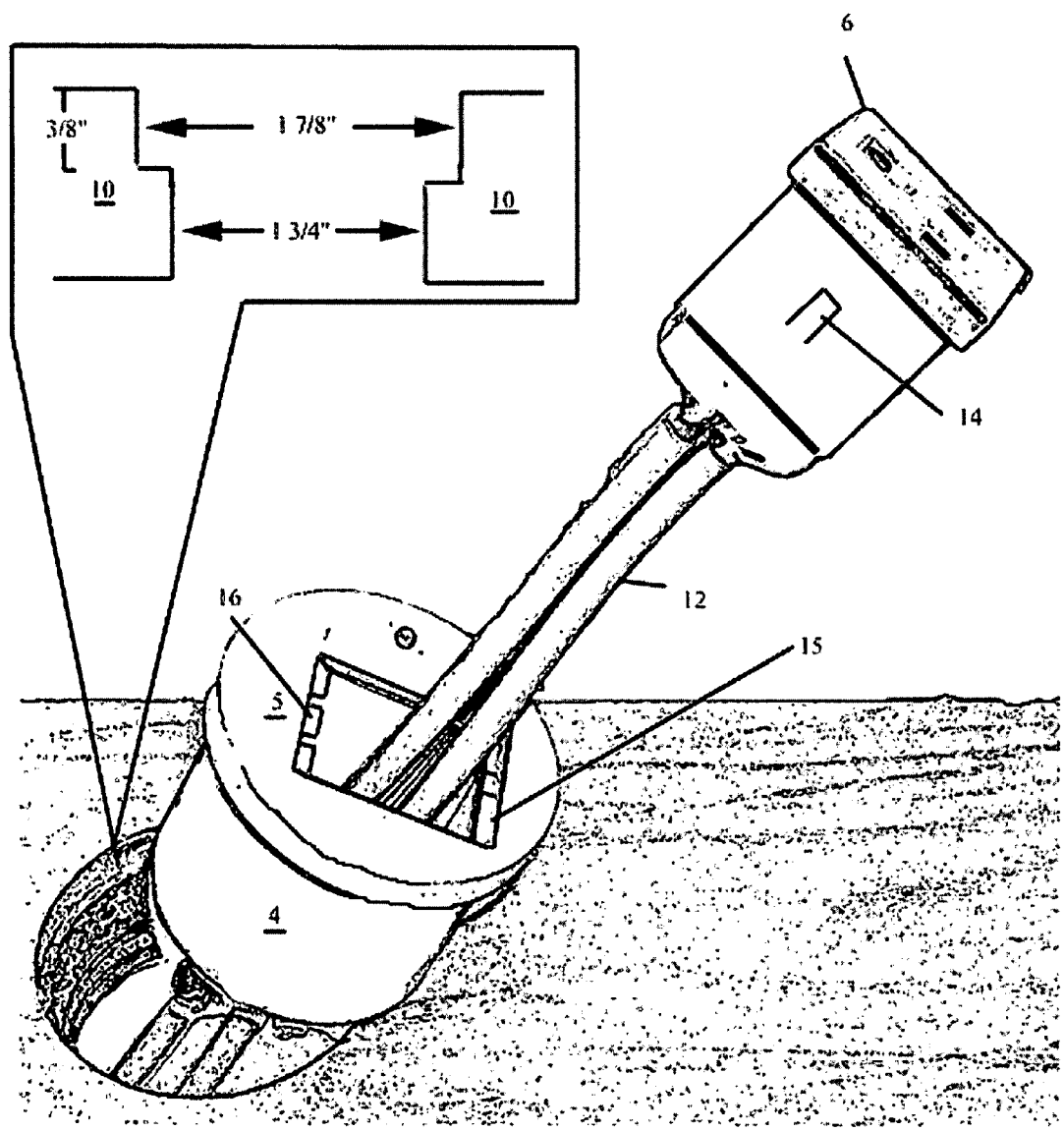
FIG. 3 is an exploded partially-disassembled side view of the compact self-contained receptacle (SCR) of FIGS. 1 and 2 showing the snap-in receptacle 6 released from cover plate 5 and removed from the housing 4.

FIG. 3 is an exploded partially-disassembled side view of the compact SCR 2 showing the snap-in receptacle 6 released from cover plate 5 and removed from the housing 4, with an inset illustration of the installation cut necessary to the solid material wall or window still 10.

Housing 4 is preferably a molded poly vinyl chloride (PVC) housing open at the top and substantially closed at the bottom, with a ½" round aperture through the bottom to pass the insulated NMS cable 12. One skilled in the art will understand that housing 4 may alternatively be other plastics or metal, such as die-cast zinc or aluminum, as allowed by Underwriter's Laboratories (UL) standards and in accordance with local electrical codes. The size of housing 4 is preferable minimized by closely conforming it to the particular snap-in receptacle 6 disclosed herein.

The cylindrical cover plate 5 is likewise preferably a molded PVC component formed as a disk-like cap substantially-closed flush at the top and open at the bottom, with a square central aperture 9 as shown in the top surface for receiving the receptacle 6. Cover plate 5 may likewise be die-cast zinc or aluminum as with housing 4. The cover plate 5 is a slightly larger diameter than housing 4 and fits-over top of the housing 4, secured thereto by adhesive, friction-fit, or by cooperating tongue-and-groove lips encircling the interior of the cover plate 5 and exterior of the housing 4 for snap-fit assemblage. If desired, the cover plate 5 may also be integrally formed with the housing 4. The cylindrical configuration results in a rounded exterior that simplifies installation inasmuch as the sill or wall 10 need only be pre-drilled (as opposed to a cutout for rectangular outlets) as shown in the inset at top left. The larger-diameter cover plate 5 acts as a flange against a properly countersunk hole in sill or wall 10, and as seen in the inset the sill or wall 10 is prepared by boring a uniform first-diameter aperture part of the way there through for seating the cover plate 5 flush, and then by boring the aperture with a slightly smaller diameter recess through the remainder of sill or wall 10 for passing the enclosure 4. For example, for a typical code-compatible dimensions of the cylindrical housing 4 and cover plate 5 are as follows:

Housing 4 diameter: 1.625" (body);

Housing 4 thickness (depth): 1.250" (body);

Cover Plate 5 diameter: 1.875"

Cover Plate 5 thickness (depth): 0.375"

Combined thickness (depth): 1.625"

Given the foregoing dimensions, the sill or wall 10 is prepared as seen in the inset by counter-sinking a uniform first-diameter aperture of 1⅞", to a depth of ⅜" (equal to the cover plate 5 thickness) there through, using a flat-bottom drill. Then a slightly smaller diameter 1¾" recess from top down through sill or wall 10 is made. This allows the larger-diameter cover plate 5 to seat against the countersunk hole in sill or wall 10. If desired, the cover plate 5 may be formed with small outward protrusions to allow it to sit flush with hole in the mounting surface 10 while the housing 4 and cover plate 5 are secured to the mounting surface 10. These protrusions are temporary, subsequently to be removed to produce a flush finished appearance of the receptacle 6 within the mounting surface 10. This eliminates the need to drill a stepped or countersunk hole in the mounting surface, but only a single hole that matches or is slightly larger than the outer diameter of the housing 4.

Each receptacle 6 is preferably a commercially available, three-wire, grounded, straight-blade single receptacle with conventional three-prong female plug configuration rated for a maximum current of 15 amps and a maximum voltage of 125 volts AC. An example of a suitable receptacle is the Schurter 4300-0703 product or like product approved by Underwriter's Laboratories, Inc. or other Nationally Recognized Testing Laboratory (NRTL) which is recognized by the Occupational Safety and health Administration (OSFIA), and also suitable for use in accordance with federal, state, county, municipal and local codes, including National Fire Protection Association CNFPA) No. 70-1999 National Electrical Code and the OSHA codes. It must be designed to National Electrical Manufacturers Association (NEMA) Wiring Devices (WD)-5 and WD-6 and ANSI C-73, and to meetlexceed UL 498 standards (UL File #E13399), Canadian Standards Association (CSA) Certified (CSA File #LR406). One skilled in the art will understand that other receptacles may be suitable such as those having proprietary female plug configurations designed to allow the use of dimming equipment, provided that applicable standards and codes are met as per the above.

In all such cases, the receptacle 6 should satisfy the test requirements of the UL 498 Specification as follows:

Overload 50 cycles at rated voltage and 150% of rated current (DC).

Temperature Rise Maximum 30° C. rise with continuous 20 A load.

Resistance to Arcing 200 cycles at rated voltage and 150% of rated current (DC).

Dielectric Voltage Withstands 1250V minimum for 1 minute.

Fault Current Grounding path retains integrity after 1000 A fault.

Mechanical (Per UL 498)

Product Identification Ratings permanently marked, visible after installation.

Environmental

Flammability V2 or better per UL 94.

Operating Temperature Maximum continuous 60° C.; minimum −40° C. (without impact).

Figure 4:
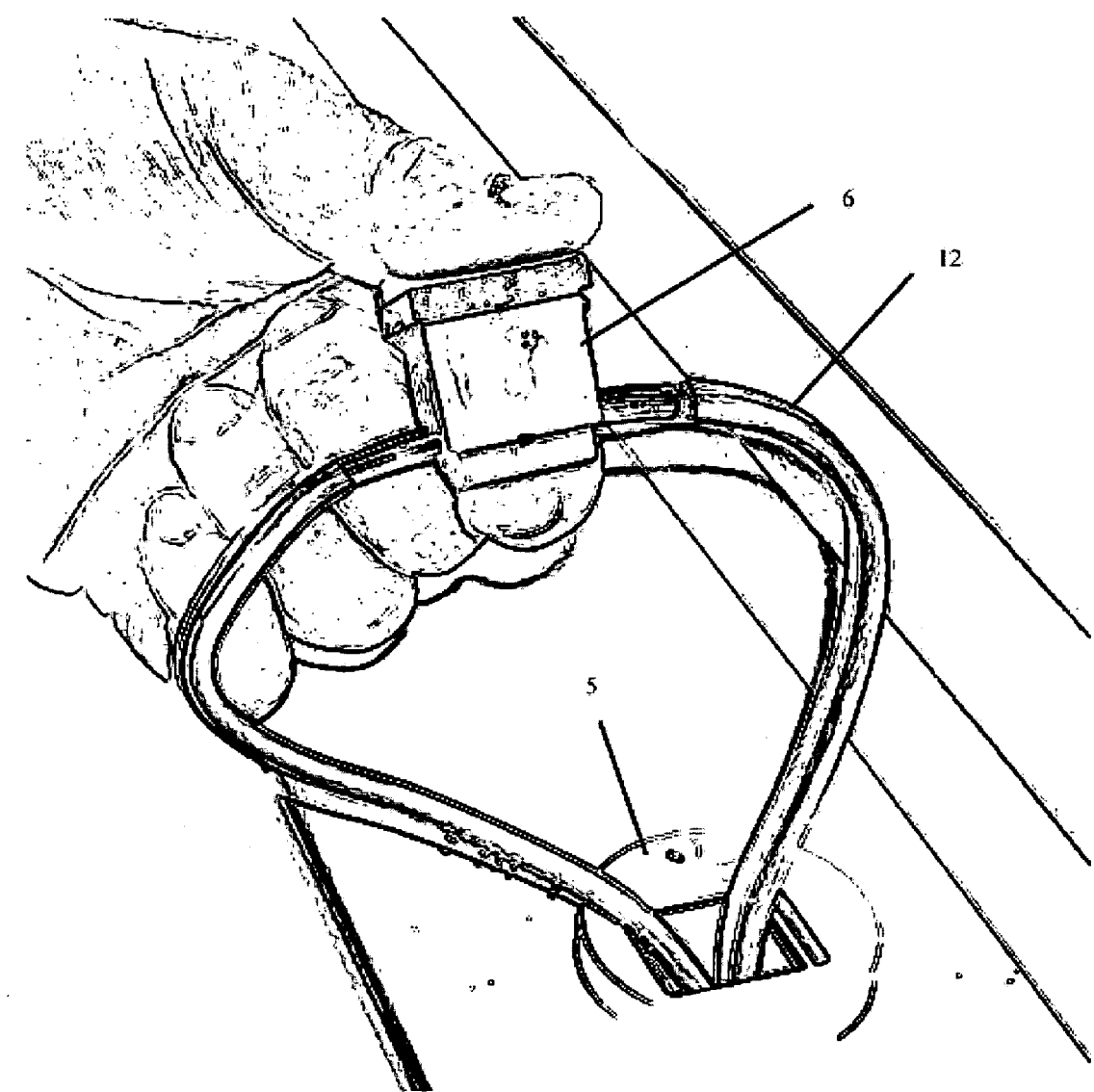
FIG. 4 is a perspective illustration showing how the receptacle 6 is wired prior to installation in the cover plate 5.

FIG. 4 is a perspective illustration showing how the receptacle 6 is wired prior to installation in the cover plate 5. The present receptacle 6 is generally dimensioned as a substantially square 1" plastic block with the three-wire insulated cable 12 attached thereto in pigtail fashion as seen in FIG. 2. The illustrated wire is non-metallic sheath wire (NMS) on the right, which must be used with this device. Generally, electrical codes will require a 2" open space around exposed contacts and this is why conventional electrical boxes are somewhat voluminous. The "pigtail" connections to the present receptacle are internal, the individual wire leads being inserted sidelong into the receptacle 6 and bent around and downward in a pigtail configuration. If desired, a conventional protective clamp may be provided for securing the strands of the NMS cable 12 together and to prevent pull-out of the NMS cable 12. The foregoing configuration satisfies the codes and eliminates the need for a 2" open space around exposed contacts, thereby allowing the square receptacle 6 to fit flush in cover plate 5 enclosed in housing 4 and conserve space. Thus, the snap-in receptacle 6 closely conforms to the square central aperture 9 in the cylindrical cover plate 5, and is thereby suspended within housing 4 with NMS cable 12 passing directly downward there through.

The receptacle 6 is provided with a pair of opposing mounting clips 14 that serve as locking detents. In accordance with the present invention (as seen in FIG, the cover plate 5 is formed with a shallow recess 15 for seating the receptacle 6 flush, and the recess 15 is defined by a shelf. The shelf is further defined by locking tabs 16 that releasably engage the mounting clips 14 of the snap-in receptacle 6. Each locking tab 16 may be defined by spaced notches in the shelf of recess 15 to give the tabs 16 some resiliency. In this manner, when the receptacle 6 is depressed into the cover plate 5 the opposing mounting clips 14 will bias inward the locking tabs 16 allowing the receptacle to pass, the locking tabs 16 snapping into place when the receptacle 6 is fully seated.

Assembly of the compact SCR 2 is as follows. Live NMS harness 12 is attached to receptacle 6 by appropriate contacts contained within the pigtail receptacle 6, and the free end of NMS 12 is threaded through the aperture in the rear of housing 4. The receptacle 6 is then snap-fit into the square aperture in housing 4. The metal clamp is tightened to hold the NMS in the housing. The wiring used to connect the above-described compact SCR 2 to a 120 VAC supply may be any suitable code-approved wiring (NMS) running inside the wall. However, for certain types of installations (such as remodeling, retrofitting existing homes, or some new construction), it is more cost effective to draw power directly from an existing outlet or switch, where the NMS 12 can be connected.

Figure 5:
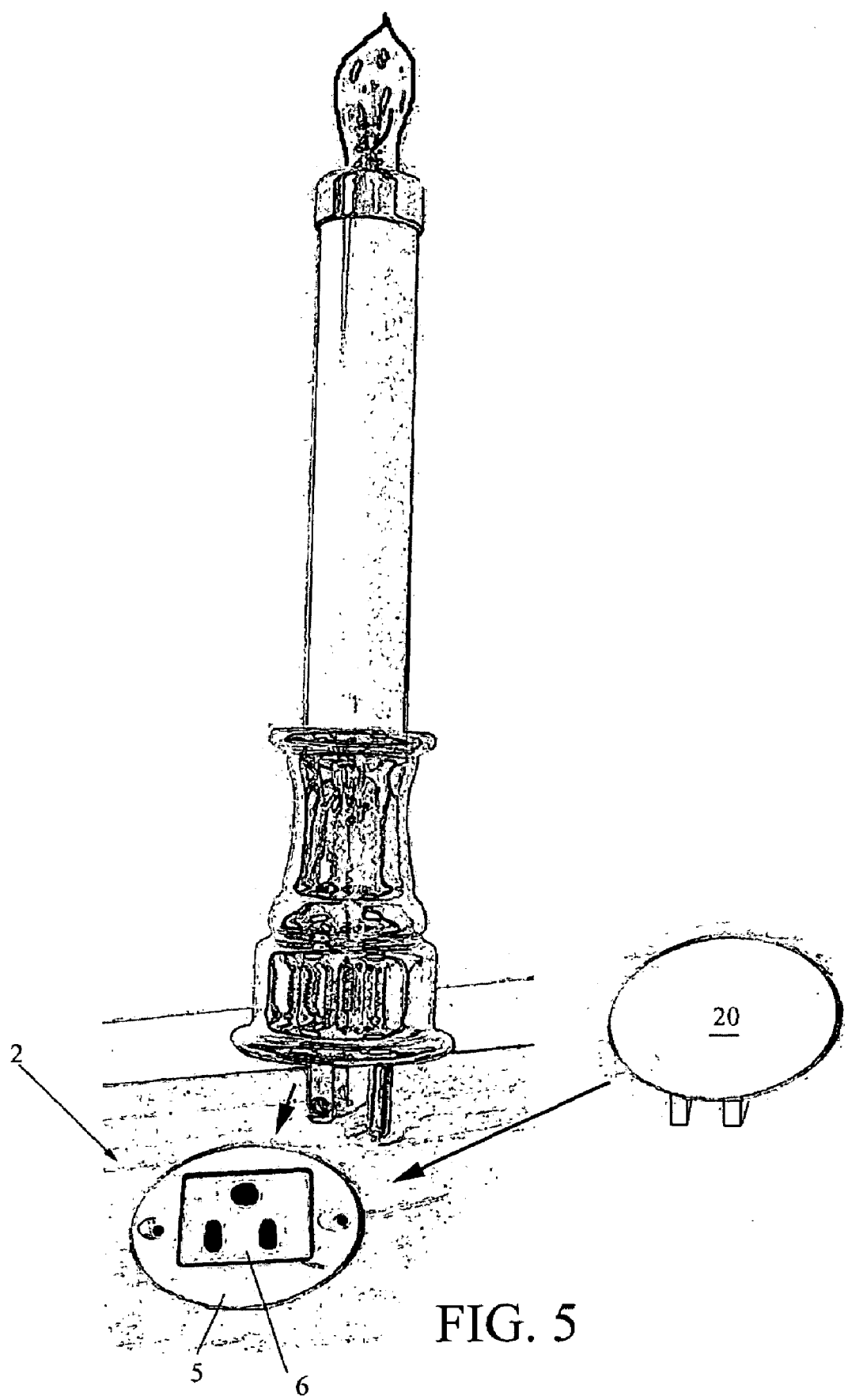
FIG. 5 is a perspective illustration of the compact self-contained receptacle (SCR) of FIGS. 1-4 in use with a direct plug decorative electric candle.

The above-described configuration provides a highly compact yet code-certified outlet inclusive of flush-mounted housing 4 and snap-in receptacle 6 that can be easily installed into an existing solid material wall or window sill 10 for use in line voltage systems utilizing 120 VAC electric service. Since the compact SCR 2 minimizes overall size without violating existing electrical codes, it is aesthetically pleasing and much better suited for retrofit installation. This makes it especially appropriate for use with direct plug decorative electric candle lighting systems such as illustrated in FIG. 5, and further shown and described in U.S. patent application Ser. No. 10/076,917 for "DIRECT PLUG ELECTRIC CANDLE LIGHTING SYSTEM, filed Feb. 13, 2002 by the inventor herein. When used for the purpose of the direct plug candle system in a window sill 10, compact SCR 2 offers maximum security, safety and aesthetics when the plug-in candle assembly is not in use.

Additionally, a safety cover plate 20 may be provided in the form of a rounded cap that is sized for a friction fit over receptacle 6 to protect it when not in use.

Alternative embodiments of the compact SCR 2 include aesthetic variations in the shape of the housing 4, receptacle 6 and cover plate 5, etc. For example, both housing 4 and receptacle 6 may be supplied in a variety of different plastics, shapes and/or surface finishes to give the user flexibility in his/her decorating style.

In addition, the snap-in receptacle 6 may be formed integrally with the cover plate 5 to present a single rounded face which attaches to the cylindrical housing 4 via screws or snapping together.

Figure 6:
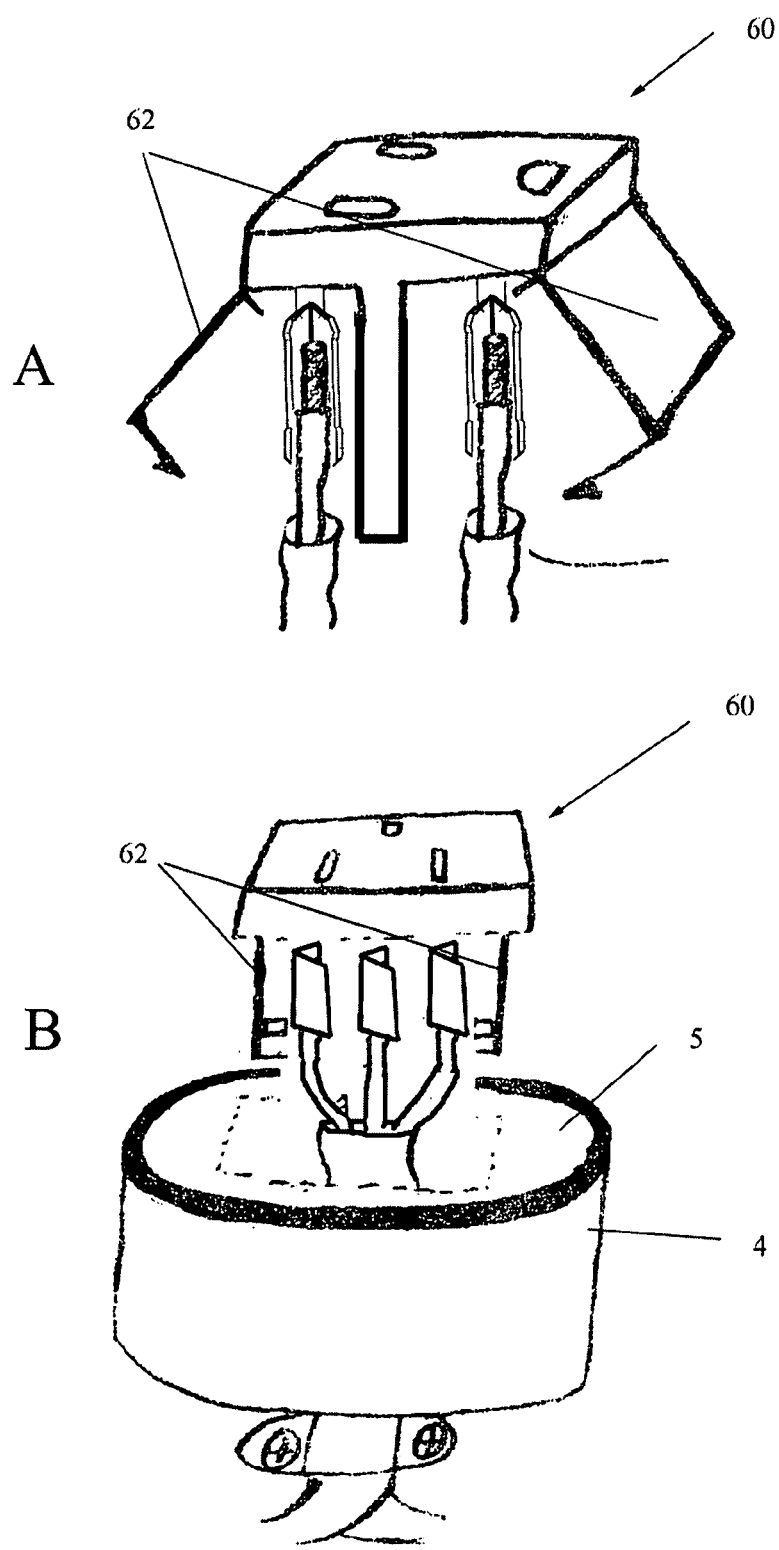
FIG. 6 (A and B) illustrate another alternative receptacle 60 which allows two separate sections of 12/2 or 14/2 nonmetallic sheathed wire (as shown) to be brought through the back of housing 4 and connected to the receptacle 60 in a "daisy-chain connection".

FIG. 6 illustrates another alternative receptacle 60 which allows two separate sections of 12/2 or 14/2 nonmetallic sheathed wire (as shown) to be brought through the back of housing 4 and connected to the receptacle 60 (commonly referred to as a "daisy-chain connection" between electrical devices). This design can employ substantially the same commercially available receptacle, e.g. Schurter 4300-0703 product; which snaps into the top of the cover plate 5, or can be made integral with cover plate 5, the assembly then attaching via screws or via snapping together with the cover plate 5 and housing 4 as previously described. However, the receptacle 60 may be equipped with "insulation displacement connection" (IDC) contacts. The IDC contacts eliminate the need for the wire to be cut at receptacle 60 if it is to continue on to another electrical device. In this case the receptacle 60 is formed with outer flaps 62 formed of non-electrical conducting material and hingedly secured to the receptacle 60 (as seen at A) to close over electrical contacts that are in the form of V-shaped yokes for seating the wires. The flaps 62 are pressed onto the wires (as seen at B) to cause the V-shaped yoke contacts to pierce through the insulation, if present, around the wire and make a secure electrical connection with the wire. Moreover, the flaps 62 also lock the wires in the yokes of the contacts to prevent the wires easy release without the outer cover first being removed.

An alternative contact in the foregoing design entails a "back-wire" connection similar to that found on commercial grade receptacles. In this case, each of the 12 or 14 gauge wires are stripped approximately ¼" and inserted into the contact and secured to it with a screw or the like (as in conventional terminal blocks), and the flaps 62 exist simply to lock down over the screws, contacts, and stripped sections of each wire to internalize the connection and conductive parts within the receptacle. The above designs will also allow for up to six individual 12 or 14 gauge wires, two hot, two neutral and one or two ground wires, contained in flexible metal conduit, as opposed to nonmetallic sheath, to be brought into the receptacle and connected as described above, provided that appropriate strain-relief is supplied at the back of housing 4. This can be provided by flexible metal conduit, commonly referred to as BX cable or MC cable.

In all such cases, the present invention provides a highly compact code-certified compact self contained receptacle including a flush-mounted housing, cover plate and snap-in receptacle that can be easily installed into an existing solid material wall or window sill for use in line voltage systems utilizing 120 VAC electric service without violating existing electrical codes, thereby making the compact self contained receptacle better suited for new-construction installation and also well-suited for retrofit installation to existing structures. The compact self contained receptacle is well-suited for use with a direct plug decorative electric candle as shown and described in U.S. Pat. No. 6,601,977 for "DIRECT PLUG ELECTRIC CANDLE LIGHTING SYSTEM, issued to the inventor herein.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. A compact flush-mount self contained cylindrical receptacle for installation into a countersunk hole of successive larger and smaller diameters that has been predrilled in a solid material wall or hollow framed window sill, comprising:

a two-piece housing including an open-ended cylindrical enclosure having an inner and outer diameter, and an attachable cylindrical cover plate formed as a cap having an inner and outer diameter and a frontal surface, the outer diameter of said cover plate exceeding the smaller diameter of said countersunk hole but not the larger diameter of said countersunk hole for seating therein, the outer diameter of said cylindrical enclosure being entirely smaller than the countersunk hole for suspension therein when attached to said cover plate, said cover plate being formed with a rectangular aperture in said frontal surface, and a pair of outwardly-angled bore-holes on opposing sides of said aperture to allow fixation by screws into sidewalls of the predrilled hole in said window sill; and a snap-in three-wire 15A/125V AC-rated electrical receptacle having a three-prong female socket configuration adapted for insertion of a male three prong electrical plug, said snap-in receptacle being adapted for insertion into the aperture of said cover plate, said cover plate including locking tabs for engagement with mounting clips on said receptacle to provide said snap-in configuration, said receptacle being thereby suspended within the cylindrical enclosure, and a face of said receptacle remaining flush with said cover plate front surface and with said window sill, and remaining accessible for insertion of a plug.

2. A compact flush-mount self contained receptacle for installation into a pre-drilled hole in a solid material wall or hollow framed window sill, comprising:

a two-piece housing including an open-ended cylindrical enclosure and attachable cylindrical cover plate having a frontal surface, said cover plate being formed with a rectangular aperture in said frontal surface, and a pair of outwardly-angled bore-holes on opposing sides of said aperture to allow fixation by screws into sidewalls of the pre-drilled hole in said window sill; and a snap-in three-wire 15A/125V AC-rated electrical receptacle having a three-prong female socket configuration adapted for insertion of a male three prong electrical plug, said snap-in receptacle including a plurality of electrical contacts formed as V-shaped yokes for, seating insulated electrical wires, and a plurality of self-sealing non-conductive outer flaps hingedly secured to the receptacle and closable over said electrical contacts to cause said electrical contacts to pierce through the insulation of said electrical wires and secure said electrical wires inside said receptacle, said snap-in receptacle being fixedly insertable into the aperture of said cover plate to suspend said snap-in receptacle within the cylindrical enclosure with a face of said receptacle remaining flush with said cover plate front surface and with said window sill, and remaining accessible for insertion of a plug.

3. The compact self contained receptacle according to claim 2, wherein said cylindrical cover plate includes locking tabs for engagement with mounting clips on said receptacle to provide a snap-in configuration.

4. The compact self contained receptacle according to claim 2, wherein the hole in said wall or sill is pre-drilled in a two-tier configuration, said cover plate being formed with a first diameter for seating within an upper tier of said pre-drilled hole, and said cylindrical enclosure is formed with a second smaller diameter.

5. The compact self contained receptacle according to claim 2, wherein the rectangular aperture in the frontal surface of the cover plate is defined by a recessed shelf for flush-seating of said receptacle.

6. The compact self contained receptacle according to claim 2, wherein said flaps on the receptacle further comprise two opposing foldover side flaps for covering said internal contacts.

7. The compact self contained receptacle according to claim 6, wherein the internal contacts comprises insulation displacement (IDC) contacts.

8. The compact self contained receptacle according to claim 2, wherein said compact self contained receptacle provides 120 VAC electric service.

* * * * *